United States Patent [19]

Fair

[11] 4,116,301
[45] Sep. 26, 1978

[54] ROTARY AIR MODULATOR

[75] Inventor: Delbert W. Fair, Ponca City, Okla.

[73] Assignee: Continental Oil Company, Ponca City, Okla.

[21] Appl. No.: 773,924

[22] Filed: Mar. 3, 1977

[51] Int. Cl.² ............................................. G01V 1/14
[52] U.S. Cl. .................................. 181/119; 181/114; 180/116
[58] Field of Search ................ 181/114, 119; 180/116, 180/117

[56] References Cited

U.S. PATENT DOCUMENTS

| | | | |
|---|---|---|---|
| 3,701,968 | 10/1972 | Broding | 181/114 |
| 3,727,717 | 4/1973 | Miller | 181/114 |
| 3,792,751 | 2/1974 | Fair | 340/17 R |
| 3,915,257 | 10/1975 | Dunlap et al. | 181/114 |

Primary Examiner—Howard A. Birmiel
Attorney, Agent, or Firm—William J. Miller

[57] ABSTRACT

Apparatus for supplying a large amount of air periodically at a controlled rate to the air cushion beneath an air-cushion vehicle as particularly employed for coupling of controlled frequency seismic energy into the earth. The apparatus consists of a vehicle body which includes a compressed air supply or input to a self-contained plenum chamber space for applying air pressure through a multi-port rotary valve thereafter to be directed into an air cushion formed between the vehicle and the earth surface with periodic exhaust to the atmosphere. The rotary air modulator or valve is comprised of a cylindrical stator, a rotor, and a shutter, each of which includes a plurality of equispaced ports, and air flow from the plenum chamber to the air cushion is modulated by passage through the stator and rotor in accordance with an intermediate shutter position; pressure exhaust is similarly controlled. The rotary air modulator valve may be driven by a servo controlled hydraulic motor to enable control of the periodic rate of flow into and out of the air cushion.

16 Claims, 19 Drawing Figures

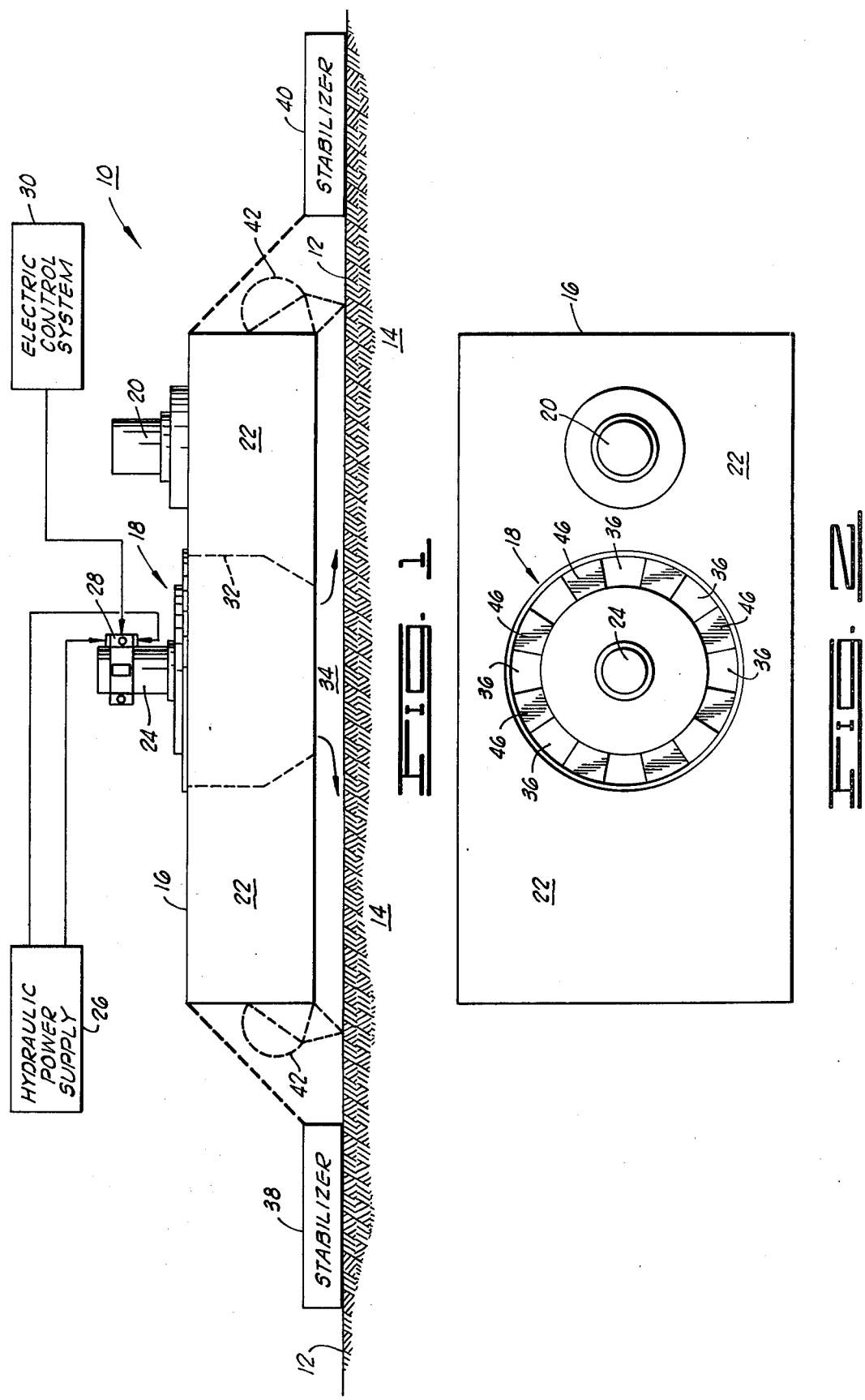

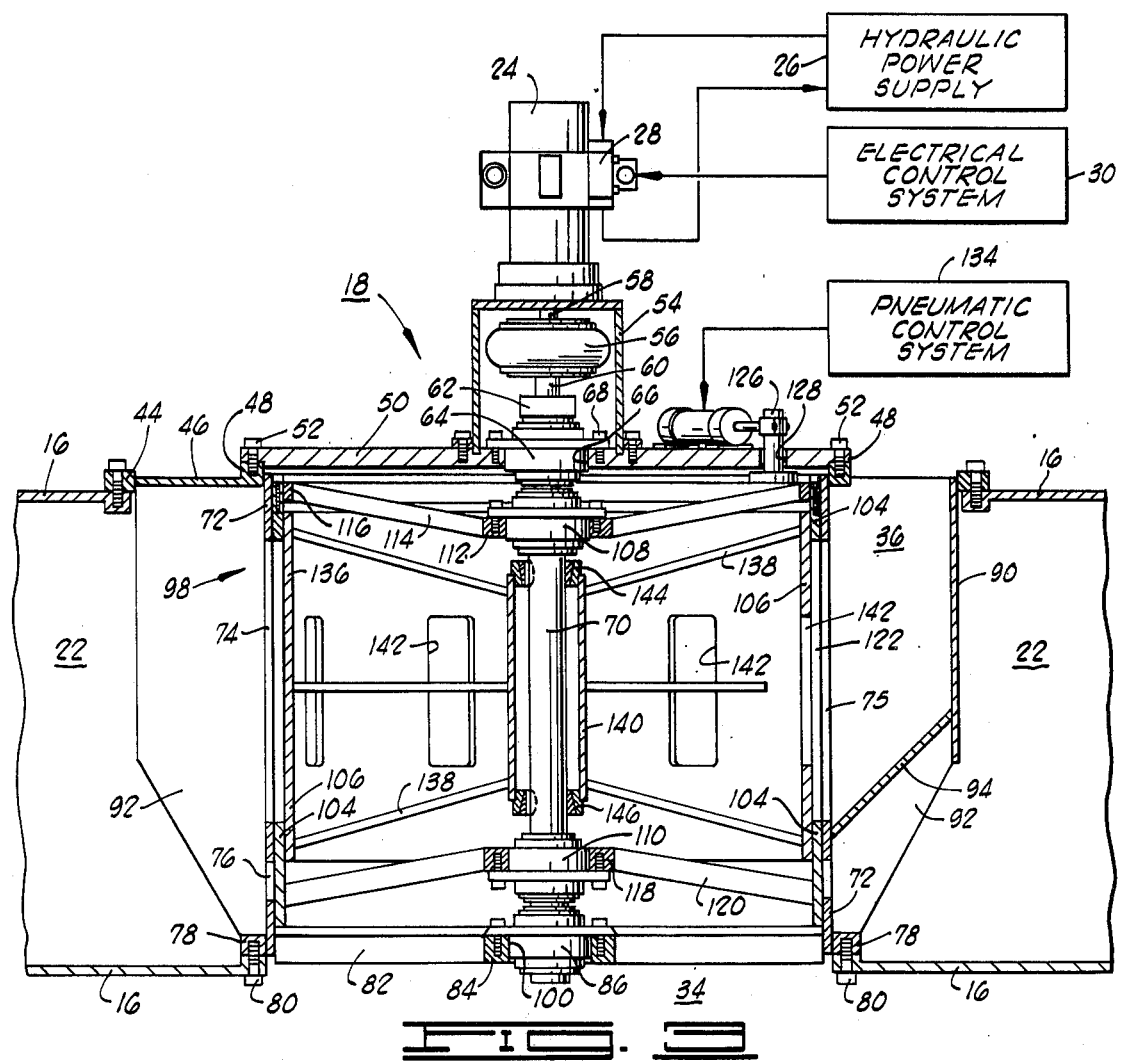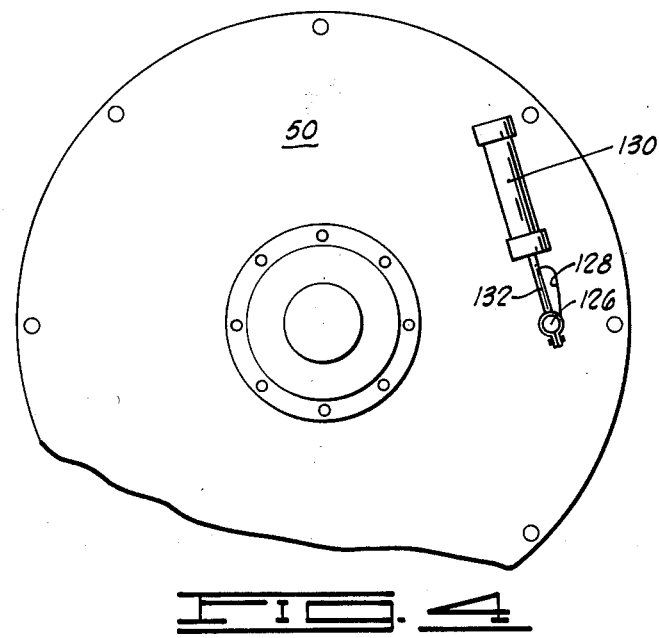

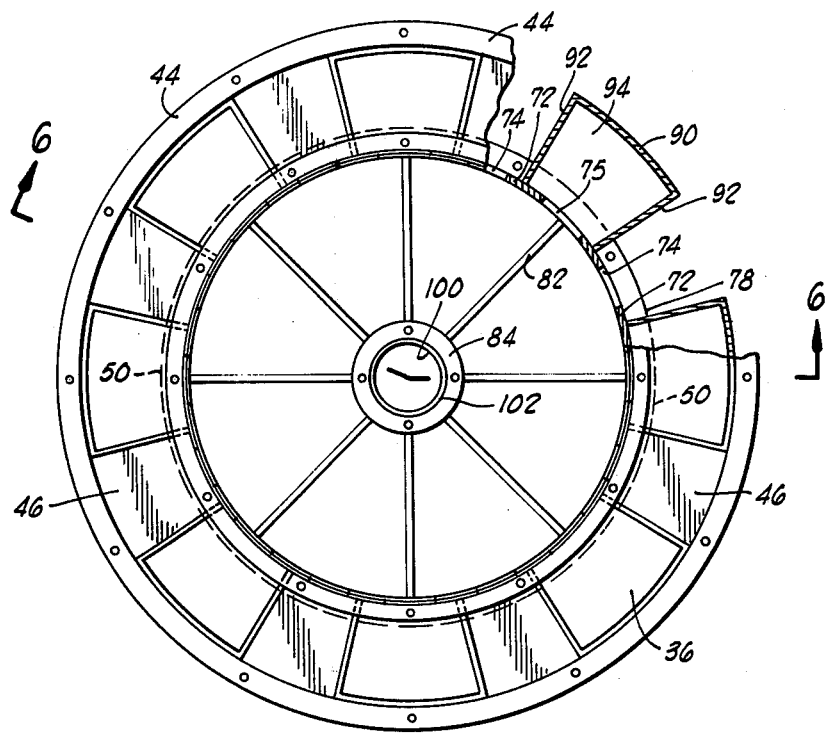
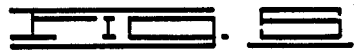
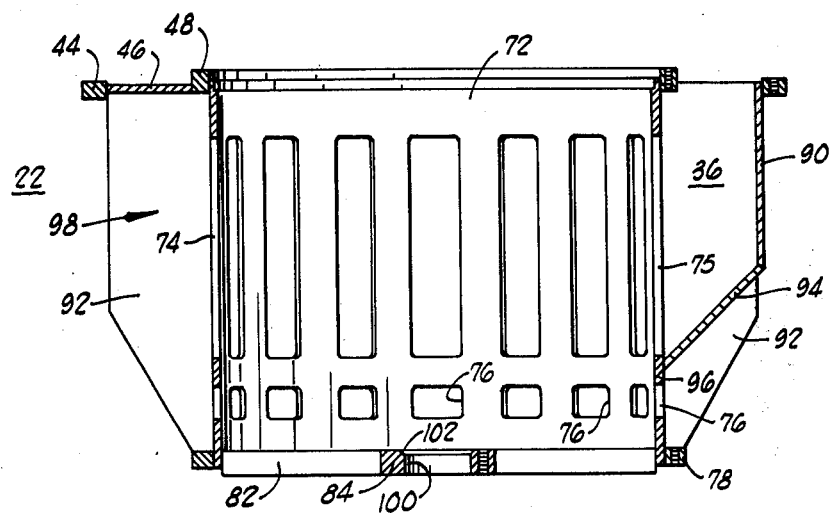
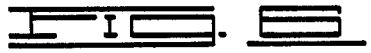

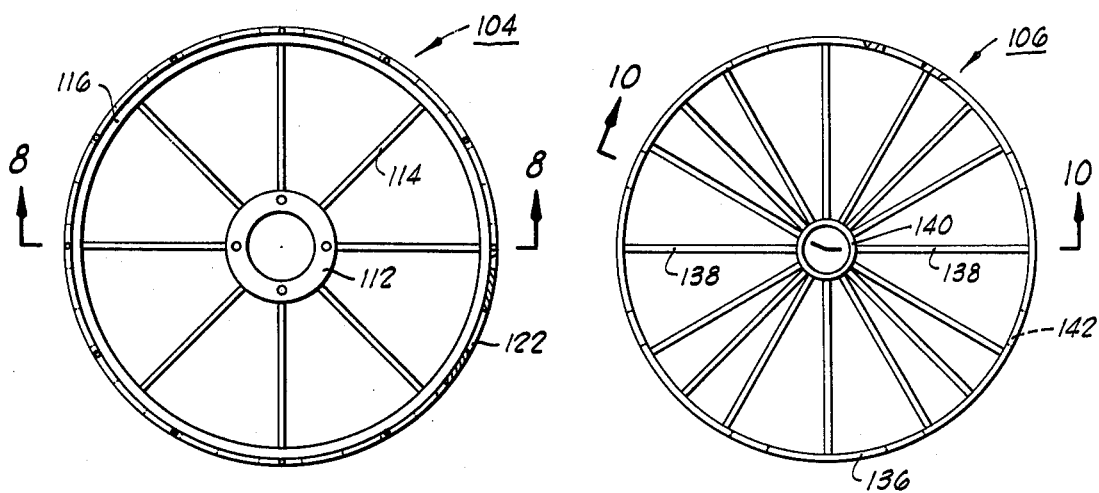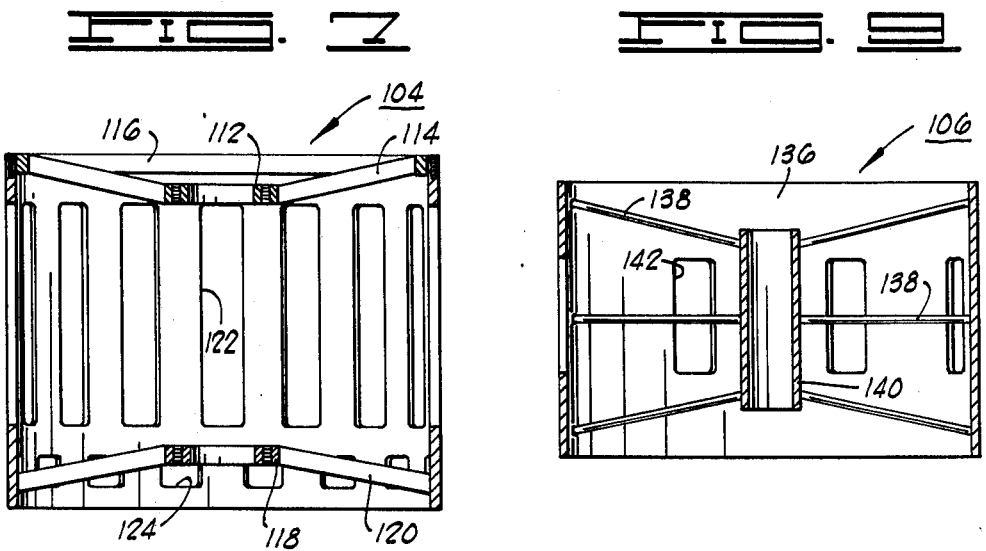

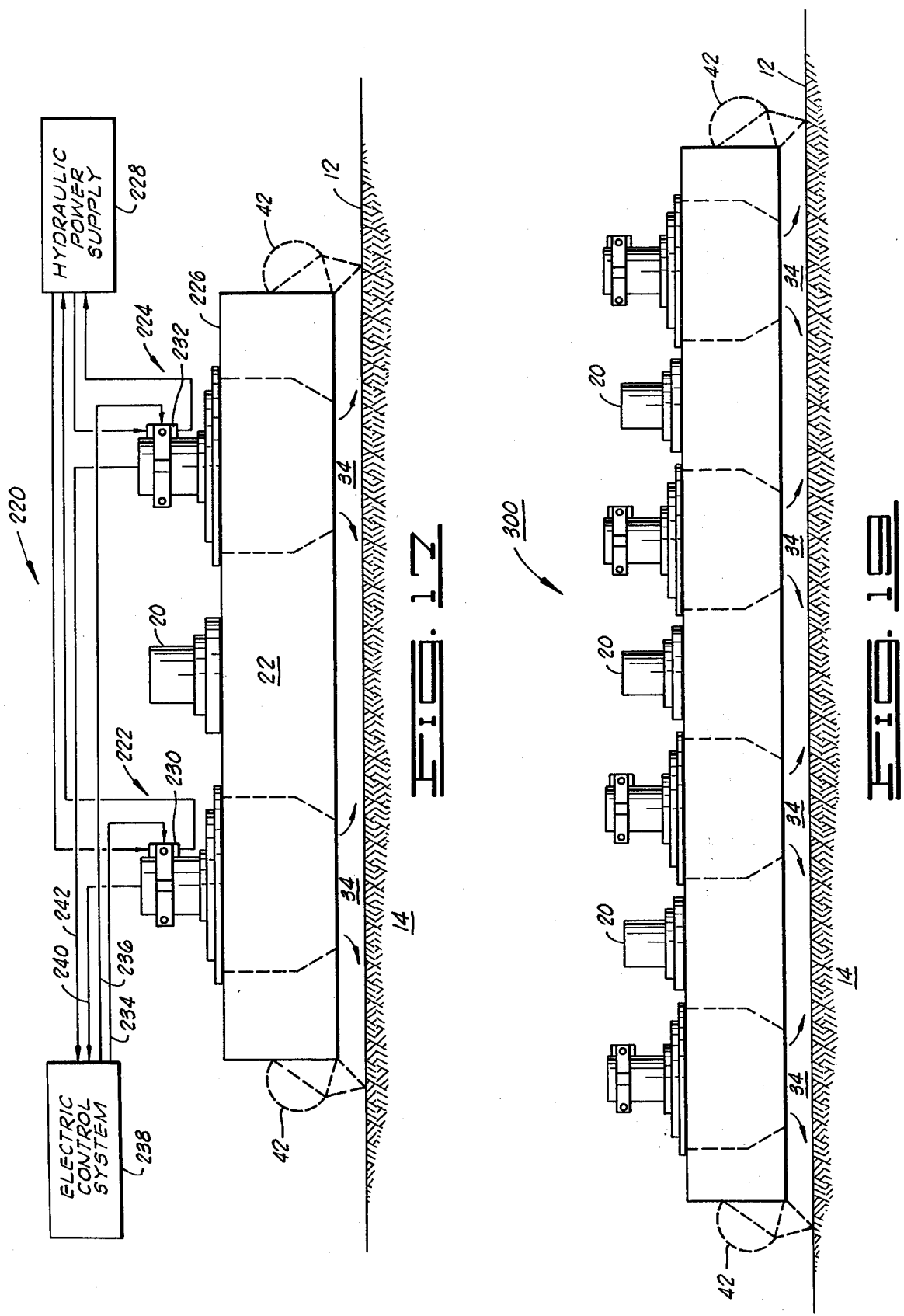

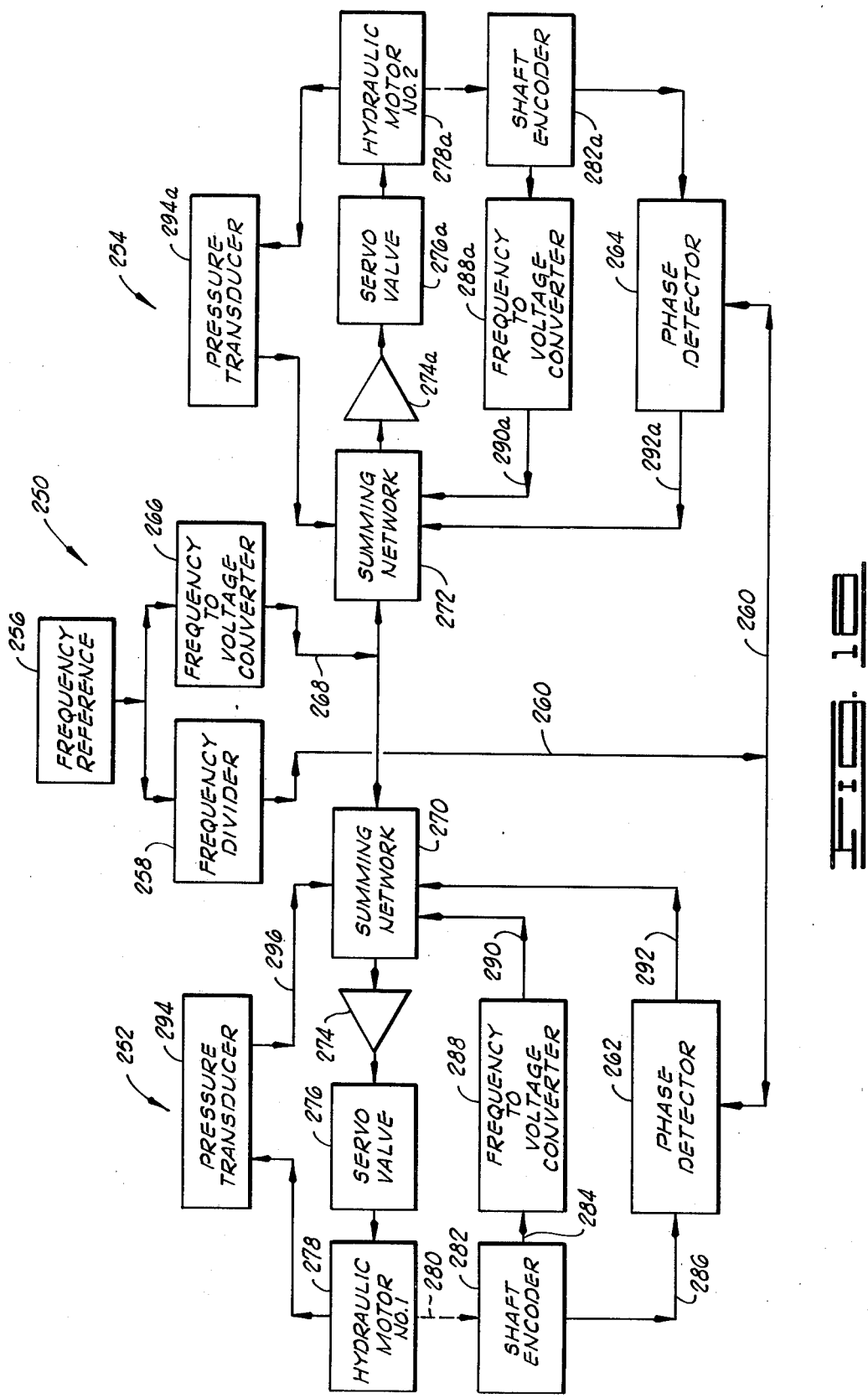

ROTARY AIR MODULATOR

BACKGROUND OF THE INVENTION

1. Field of the Invention

The invention relates generally to seismic energy vibrators and, more particularly, but not by way of limitation, it relates to an air cushion seismic vibrator and air modulation valve enabling precise control of frequency and wave shape of compressional wave energy input to the earth.

2. Description of the Prior Art

The prior art includes relatively few teachings which relate to seismic energy generation through pressure modulation of an air cushion for coupling seismic wave energy into the earth's surface. A more recent teaching which is directed to an air cushion seismic vibrator attempting particular modulation control is U.S. Pat. No. 3,701,968 in the name of Broding, as issued on Oct. 31, 1972 under title "Air Cushion Seismic Vibrator". This patent reviews the basic concepts and particular modulation approaches in developing an air cushion of sufficient magnitude while maintaining attendant modulation capability. Yet another U.S. Pat. No. 3,792,751 in the name of Fair, as issued Feb. 19, 1974 and entitled "Air Cushion Seismic Signal Source", provides still additional teachings in the development of a sufficiently reliable and strong air cushion seismic source; and this patent is directed to a specific type of air pressure modulator for controlling the entry and exhaust of air to the coupling air cushion at a selected rate.

SUMMARY OF THE INVENTION

The present invention contemplates an air cushion seismic energy source which is capable of modulating and passing air flow of greater magnitude with a greater degree of control as to frequency and frequency variation, as well as definition of the start and stop periods of seismic energy input to the earth. In a more limited aspect, the invention consists of a particular form of multi-port rotary valve for use with a compressed air source and vehicle carrier which functions to generate an air cushion upon a selected earth location in order to generate compressional seismic wave energy within the earth medium. The rotary air modulator consists of a multi-port stator, an intermediate multi-port shutter, and a hydraulically driven rotor disposed in concentric relationship in such manner that shifting of the shutter and control of the rotor speed enable generation of a pressure fluctuating air cushion at a precisely controlled frequency and duration.

Therefore, it is an object of the present invention to provide an air flow control device which can cause modulation of the air pressure in an air cushion at a controlled rate.

It is also an object of the present invention to provide an air cushion seismic energy generator which couples compressional wave energy having precise frequency, frequency variation and output duration into an earth medium.

It is yet another object of the present invention to provide an air modulation device which is also capable of diverting air from the modulating structure directly into the air cushion beneath the vehicle carrier thereby to increase flying height and stability of the carrier when moving across terrain.

It is still another object of the invention to enable generation of air-coupled seismic energy at known initial frequency and precise time of commencement.

Finally, it is an object of the present invention to provide an air cushion seismic generator which is capable of precisely controlling the length of taper on the start and finish of generated air modulation bursts and, therefore, resulting compressional wave energy coupled into the earth.

Other objects and advantages of the invention will be evident from the following detailed description when read in conjunction with the accompanying drawings which illustrate the invention.

BRIEF DESCRIPTION OF THE DRAWINGS

FIG. 1 is a schematic drawing showing the air cushion device in side view as disposed on an earth location;

FIG. 2 is a top view in generalized schematic form of the air cushion device of FIG. 1;

FIG. 3 is a vertical section of a rotary air modulator constructed in accordance with the present invention;

FIG. 4 is a generalized top plan view of a portion of the rotary air modulator of FIG. 3;

FIG. 5 is a top view of the stator of the rotary air modulator of FIG. 3;

FIG. 6 is a section taken along lines 6—6 of FIG. 5;

FIG. 7 is a top view of the shutter of the rotary air modulator of FIG. 3;

FIG. 8 is a section taken along lines 8—8 of FIG. 7;

FIG. 9 is a top view of a rotor of the rotary air modulator of FIG. 3;

FIG. 10 is a section taken along lines 10—10 of FIG. 9;

FIG. 17 is a schematic drawing showing an air cushion vibrator utilizing dual rotary air modulators;

FIG. 18 is a block diagram illustrating frequency control and synchronism circuitry as utilized for control of plural rotary air modulators; and FIG. 19 is a schematic drawing showing an air cushion vibrator utilizing a plurality of synchronized rotary air modulators.

DETAILED DESCRIPTION OF THE INVENTION

Figure 11:
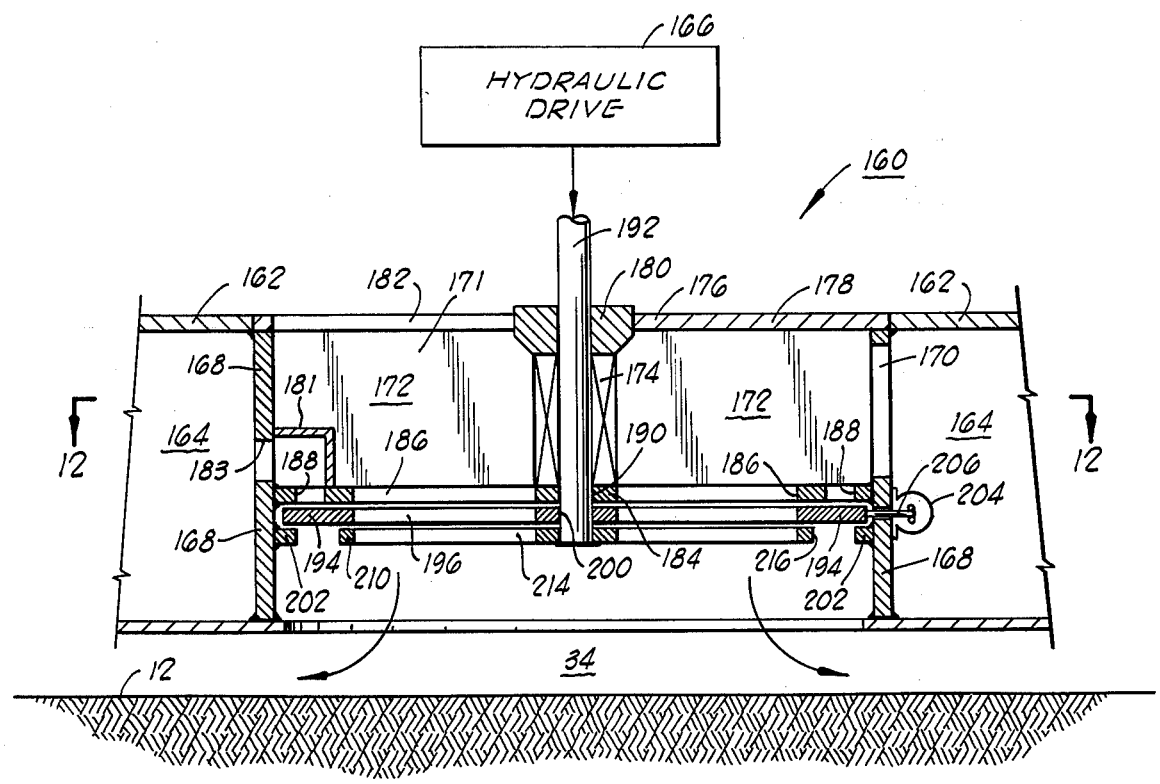
FIG. 11 is a vertical section of an alternative form of rotary air modulator constructed in accordance with the present invention.

FIG. 1 illustrates an air cushion vehicle 10 of the type which is suitable for use as a seismic signal source for generation of seismic wave energy as coupled through earth surface 12 into earth medium 14. The air cushion vehicle 10 consists of a body or carrier 16 which includes a rotary air modulator 18 and a fan compressor or air source 20. FIG. 2 shows a generalized top view of carrier 6 with illustration of one form of placement of a single rotary air modulator 18 and air source 20.

The carrier 16 may be formed of plate metal or the like to form an amply large internal volume or plenum chamber 22. That is, the total volume within carrier 16, except that volume occupied by rotary air modulator 18, forms plenum chamber 22 in order to provide a constant supply of increased air pressure, as will be further described below.

The rotary air modulator 18 is driven by a hydraulic motor 24 supplied from a constant pressure hydraulic power supply 26. A servo valve 28 responsive to a suitable electric drive system 30 provides operational control of hydraulic motor 24. The hydraulic and electrical drive systems 26 and 30 may be any of various well-known assemblies suitable for the purpose, and similar circuitry and structure is discussed in the aforementioned prior art U.S. Pat. No. 3,792,751 in the name of Delbert W. Fair, as assigned to the present assignee. The air source 20 is shown generally as being comprised of a high air flow, hydraulically driven fan which directs compressed air downward into plenum chamber 22. The rotary air modulator 18 then functions to control direction of compressed air from plenum chamber 22 through the modulator circumference, as shown in dashed lines 32, to modulate air pressure within an air cushion 34 adjacent to earth surface 12. Exhaust air present during one-half cycle of the air modulation finds release through a plurality of exhaust ducts 36 (See FIG. 2) around the outer, upper periphery of rotary air modulator 18, as will be further described below.

A generalized form of stabilizers 38 and 40 are indicated as mechanically linked to air cushion vehicle 10 for the purpose of maintaining the carrier 16 stationary or under controlled movement at a designated earth location. It is presently contemplated that hydraulically controlled wheel support will constitute a rear end stabilizer or stabilizer 38 while the opposite end of carrier 16 is supported by a hydraulically controlled tractor trailer hitch. That is, hydraulic control enables the stabilizer connections to be made rigid for road travel, but to be released into a vertically floating or guided condition when in placement over a designated earth location for operation as a seismic vibrator.

The associated hydraulic power plant and hydraulic supply system 26 and the electric drive system 30 may be located, for example, on the bed of the tractor trailer (not shown) and, if desired, the air source 20 may be located on the tractor trailer with provision of a conduit to carrier 16 for input of compressed air, e.g., an air source similar to that described and illustrated in U.S. Pat. No. 3,792,751 may be used. It is also contemplated that ground-contacting resilient skirt 42 be utilized around the periphery of carrier 16 in order to concentrate and enable more accurate control of the air cushion 34. Air skirt 42 is also more fully discussed in the aforementioned U.S. Pat. No. 3,792,751 and the exact type is the subject of a U.S. patent application Ser. No. 773,925, filed concurrently herewith.

FIG. 3 illustrates the rotary air modulator 18 as secured in carrier 16 and surrounded by the internal volume or plenum chamber 22. The rotary air modulator 18 is primarily supported by a ring frame 44 adapted for bolt securing to the upper plate of carrier 16 and including radial plates 46 leading inward to formation of a securing ring 48. As shown in FIG. 2, the radial plates 46 are alternately intersticed with exhaust ports 36 around rotary air modulator 18. A top plate 50, shown also in FIG. 4 in partial view, is then secured over securing ring 48 by means of a plurality of equi-spaced bolts 52 thereby to provide journaled support for the hydraulic motor and rotary elements of rotary air modulator 18, as will be further described.

Thus, a cylindrical housing 54 is securely affixed about the central axis of top plate 50 to provide seating for hydraulic motor 24 as well as housing space for a coupling 56 transforming rotation from hydraulic output shaft 58 to a drive shaft 60, collar 62 and bearing assembly 64. The bearing assembly 64 is secured within central bore 66 of top plate 50 by means of bolts 68 or like fasteners. The collar 62 is connected to provide vertical support to the suspended rotational assembly, as will be further described.

A cylindrical stator member 72, having a plurality of equi-spaced ports, alternating intake ports 74 and exhaust ports 75, as well as lesser area auxiliary port 76 disposed therebelow, is then affixed as by welding or such within securing ring 48. The lower periphery of stator 72 is welded to a lower securing ring 78 which, in turn, is secured by a plurality of equi-spaced bolts 80 within lower plating of carrier 16. A plurality of radial bars 82 are then secured between the lower extremity of stator 72 and mounting hub 84 to which a bottom bearing assembly 86 is bolt-attached to provide lower rotational support for rotor shaft 70.

In present design the bearing assemblies 86 and 64 are a commercially available type identified as Dodge Type E Piloted Flange Bearings with Timken Tapered Roller Bearings, these being of 2 inch shaft size. The hydraulic motor 24 is presently designated as a servo-motor Type No. A084S276 which is commercially available from Moog Incorporated, and the coupling 56 may be such as a size PX60 Dodge Para-Flex Taper-Lock Coupling, also a well-known and commerically available type. Finally, the servo valve 28 is readily operative in coaction with hydraulic motor 24, and it may be a Model 76M102 type as manufactured by Moog Incorporated.

FIGS. 5 and 6 illustrate in further detail the structure of stator 72 and the attached radial plates 46 and outer securing ring 44. The exhaust ducts 36 are open to the exterior above and defined by a plurality of arcuate plates 90 weld-fixed within securing ring 44 between alternate pairs of radial plates 92. A bottom plate 94 is then weld-fixed between each arcuate plate 90 and a respective plate portion 96 of stator member 72 which lies adjacent a port 75 to define an exhaust duct 36. The alternating intake ducts 98 are open to plenum chamber 22, as defined by alternate pairs of radial plates 92, but closed at the top by each of radial plates 46 as welded in enclosure. All auxiliary ports 76 communicate with plenum chamber 22.

The mounting hub 84 includes a central bore 100 with chamfered upper periphery 102 for receiving bearing assembly 86 downwardly therein in secure affixure; bearing assembly 86 supports rotor shaft 70 therein to provide rotational support for shutter 104 and rotor 106 (See FIG. 3). Thus, as securely seated within carrier 16, alternate ones of ports 75 and 74 each communicate with an exhaust duct 36 and intake duct 98, respectively. In one present design, there are eight intake ports 74, eight exhaust ports 75, and 16 auxiliary ports 76, but the numbers, size and association may be varied to achieve specific characteristics.

Referring again to FIG. 3, the shutter 104 is supported for controlled relative movement on rotor shaft 70 by means of bearing assemblies 108 and 110. The bearing assembly 108 is secured within a mounting ring 112 which extends a plurality of equi-spaced radial bars 114 outwardly into affixure with a mounting ring 116 which is secured by a plurality of fasteners to the upper periphery of shutter 104. The lower bearing assembly 110 is similarly affixed within a mounting hub 118 which extends a plurality of radial bars 120 outwardly into weld affixure within the lower periphery of shutter 104. The bearing assemblies 108 and 110 may be the same kind of Dodge Type E Piloted Flange Bearings as aforedescribed.

FIGS. 7 and 8 illustrate the structure of shutter 104 with more clarity. It may be noted that shutter 104 includes a plurality of equi-spaced ports 122, the same number as ports 74 and 75 of stator 72 (See FIG. 6); however, a like number of auxiliary ports 124 are disposed circumferentially and in alternation relative to ports 122, i.e., not vertically in-line as are ports 74, 75 and 76 of stator 72 (FIG. 6).

The shutter 104 is constructed to be rotated reciprocally in control of air flow by means of a pivot arm 126 (FIG. 3) which is secured to the inner, upper periphery of shutter 104, e.g., mounting ring 116, to extend through an access slot 128 formed through the top plate 50 (See FIGS. 3 and 4). A pneumatic cylinder 130 is mounted adjacent access slot 128 on top plate 50 to extend an actuation or rod arm 132 into pivotal affixure to arm 126 such that actuation, via pneumatic control system 134 is effective to reciprocate the shutter 104. The pneumatic control system 134 may be any of suitable conventional structure, e.g., a double solenoid air pressure actuator.

Referring now to FIGS. 9 and 10, the rotor 106 is shown as consisting of a cylindrical plate 136 suspended by a plurality of spokes or radial bars 138 from a central, axial cylindrical sleeve 140. The suspending radial bars 138 may be disposed in any balanced manner, but present design utilizes twelve radial bars 138 equi-spaced about the inner periphery of cylinder 136 in each of the upper and lower positions with an additional eight center radial bars 138 affixed in equi-spaced circumferential manner. The number and disposition of such radial bars 138 is well within design skill as ultimate balance of rotor 106, may be achieved after final fabrication and machining. A plurality of rotor ports 142, in present design eight in number, are then disposed in vertically centered and equi-spaced alignment about the circumfery of cylinder 136, and the vertical height of rotor ports 142, in this particular design, is approximately one-half the vertical height of ports 74 of stator 72 and ports 122 or rotor 166. While rotor port height may be varied, the width is more critical as to degrees of opening.

As shown in FIG. 3, the rotor sleeve 140 is suspended from rotation on rotor shaft 70 by means of hub/bearing assemblies 144 and 146, upper and lower, respectively. Assemblies 144 and 146 may consist of such as Dodge Taper-Lock Type S Weld-On Hub elements as affixed to sleeve 140 and functioning interactively with Dodge Taper-Lock Bushings, Part No. 2012, as secured on rotor shaft 70 in proper vertical spacing.

In present design, the stator 74 includes sixteen ports 74 and 75 which are disposed alternately and equi-spaced at 22.5° spacing and the width of each port is 10 3/4°. Similarly, the ports 122 of shutter 116 are disposed in like manner on 22.5° spacing with a width of 10 3/4°, and it is observed in measurement that a common reference point be used in order to eliminate any accumulation of error about the circumference. The rotor ports 142 are also equi-spaced in formation about the inner circumference of cylinder 136, and each is formed with a width of 10 3/4°. The rotor port openings are presently calculated to enable a change of pressure of approximately one-half between the open and closed positions but the shape, size and number of ports may be varied considerably to achieve selected operational effects.

Operation of the system is discussed with reference to FIGS. 1, 2 and 3. The rotary air modulator 18 is driven by means of hydraulic power supply 26 and electrical control system 30, each of which are well known in the related art, to control air flow to the air cushion 34 in a manner to cause a modulation of the air pressure therein. The modulation of the pressure within the air cushion 34 then generates a compressional seismic wave energy in the earth or water medium therebelow which has extremely good earth penetration effects. The air source 20 maintains a relatively high increased air pressure within plenum chamber 22, i.e., on the order of 1.4 psi in the present design which pressure is controllably modulated by means of the rotary air modulator 18 to the air cushion 34.

When it is desired to modulate, pneumatic control system 134 is actuated to operate shutter 104 to its open position; that is, in the modulating position, wherein air from the plenum chamber 22 can flow through the intake ports 74 (and exhaust ports 75) of stator 72 as well as ports 122 of shutter 104. At the same time, the auxiliary ports 76 and 124 are closed. As rotor 106 is then rotated, air is periodically able to flow through rotor ports 142 each time they line up with a respective intake shutter port 122 to allow passage of air under pressure from the respective intake ducts 98 into the air cushion 34, thus increasing the pressure therein. And, alternately, as the rotor 106 lines up with the exhaust ports 75 and respective exhaust shutter ports 122, air can flow from the air cushion 34 through the porting and via exhaust ducts 36 to the atmosphere thereby to decrease pressure in the air cushion. Thus, an air cushion pressure fluctuation above and below a mean cushion pressure is generated for coupling of energy into the earth surface.

The controlled rotation of the rotor 106 results in an air pressure modulation within air cushion 34 which, in turn, generates compressional seismic wave energy into the medium coupled thereto, e.g., a water or earth medium. The rotor 106 is readily controlled in well-known manner by the hydraulic servo system, and the frequency of air flow modulation is controlled by and directly proportional to the rotational speed of the rotor. Peak flow modulation amplitude is constant for all frequencies, and the device has the inherent feature of allowing variation in the length of taper at the start and/or finish of an air modulation sequence by controlling duration of shutter opening or closing.

Facile mobility of the air cushion vehicle 10 is imparted through enabling of continual, increased-height flying capability. Thus, auxiliary ports 76 of stator 72 align with auxiliary ports 124 of shutter 104, when in the shutter-closed position, thereby to enable air pressure flow from plenum 22 into air cushion 34 to increase the flying height of the vehicle 10 during the moving periods.

ALTERNATIVE EMBODIMENT

FIG. 11 illustrates a rotary air modulator 160 which provides the same functions as rotary air modulator 18 (See FIG. 1) while utilizing disc structure as an alternative to the cylindrical structure. Thus, rotary air modulator 160 may utilize a body or carrier 162 defining a large volume plenum chamber 164. Modulator 160 receives controlled rotational input from a hydraulic drive 166 which may be similar to that illustrated in FIG. 1.

Figure 12:
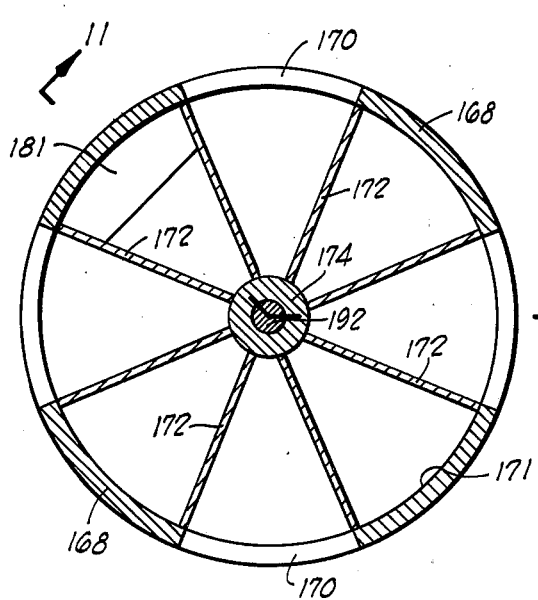
FIG. 12 is a sectional view of an upper portion of rotary modulator cylinder of the device shown in FIG. 11.
Figure 13:
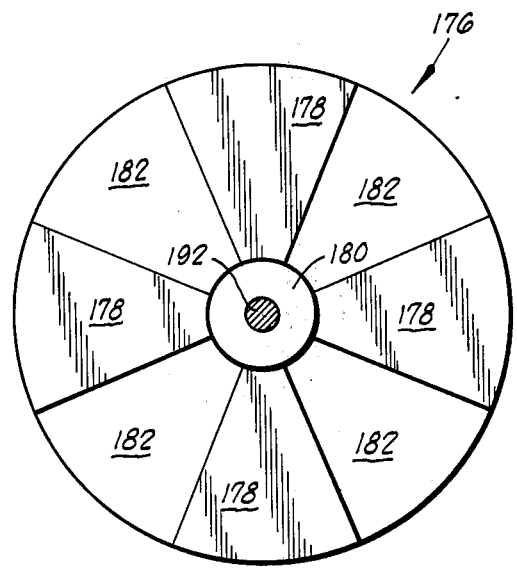
FIG. 13 is a plan view of a top plate as utilized in the device of FIG. 11.

The rotary air modulator 160 consists of a cylinder 168 as secured within carrier 162 and surrounded by plenum chamber 164 with communication via a plurality of equally-spaced intake ducts 170 and alternating exhaust ducts 171. FIG. 12 illustrates a sectional view of the upper portion of cylinder 168 as a plurality of radial plates 172 are affixed in equi-spaced array to extend between the inner sides of cylinder 168 and a suitable bearing support 174 to define the intake and exhaust air passages. A top plate 176 (FIG. 13) is weld-secured over cylinder 168 and is also of radial character in that it includes a plurality of equi-spaced sector plates 178. Each of the sector plates 178 is secured to a bearing collar 180 to extend into affixure at the top rim of cylinder 168 thereby to close off the alternating pairs of sector plates 172 which define intake ducts 170 to plenum chamber 164. The remaining alternating ducts 171 which are closed off from plenum chamber 164 then communicates with the external atmosphere through sector ducts 182. Partitions (8) are weld-secured to define auxiliary port plenum communication via cylinder ports 183.

Figure 14:
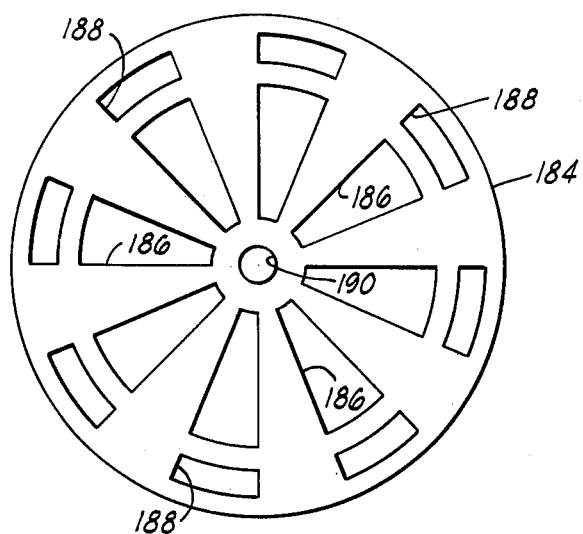
FIG. 14 is a plan view of a stator plate as used in the FIG. 11 embodiment.

The lower extremity of radial plates 172 is then covered by a stator plate 184 (FIG. 14) which is secured as by welding therebeneath. FIG. 14 shows stator plate 184 as consisting of a plurality of equi-spaced sector ports 186 in alignment with a respective auxiliary port 188. A central bore 190 allows sealed, rotational passage of rotary drive shaft 194 from hydraulic drive 166. Suitable journal and bearing assemblies of conventional type may be utilized as required, this having been fully developed with respect to FIG. 3. The stator plate 184 is affixed beneath radial plates 172 so that alternate ones of sector ports 186 are in communication with a respective intake duct 170 and plenum chamber 164.

Figure 15:
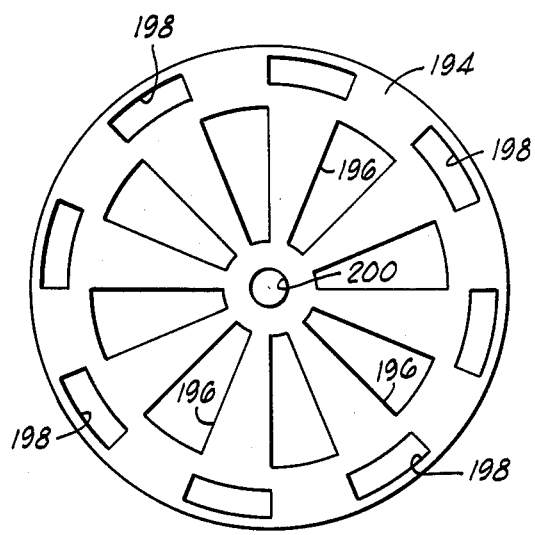
FIG. 15 is a plan view of a shutter disc as utilized in the embodiment of FIG. 11.

A shutter disc 194 is then movably supported immediately below stator disc 184 by suitable journal and support structure. As shown in FIG. 15, shutter disk 194 includes a plurality of equi-spaced ports 196 as well as a plurality of equi-spaced peripheral auxiliary ducts 198 which are disposed radially between each adjacent pair of ports 196. A central bore 200 allows sealed, rotary passage of drive shaft 192, and an outer support ring 202 is secured within the inner circumfery of cylinder 168 (See FIG. 11) beneath the outer edge of shutter disk 194. A pneumatic cylinder 204 functions through an actuating arm 206 as suitably fed through cylinder 168 to effect reciprocal movement of shutter 194.

Figure 16:
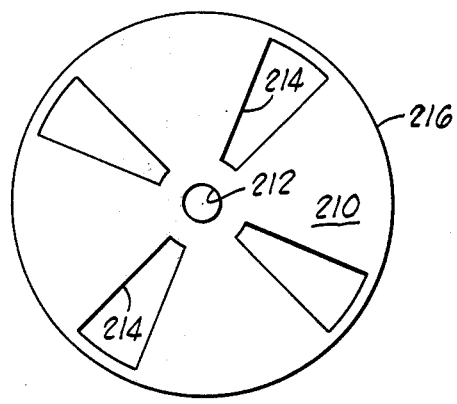
FIG. 16 is a plan view of a rotor disc as utilized in the embodiment of FIG. 11.

A rotor disk 210 is then rigidly secured to the lower end of drive shaft 192 by means of a central bore 212 (See FIG. 16). Rotor disk 210 consists of a plurality of equi-spaced radial ports 214 which effect air modulation when driven at a selected rotational speed. Rotor disk 210 is rotationally supported in close proximity beneath shutter disc 194 and it can be noted that the outer circumferential edge 216 of rotor disc 210 is of smaller diameter than that of shutter 194 in order to allow free air passage between the auxiliary ports 198 and the air cushion 34.

The operation of rotary air modulator 160 is similar to that of rotary air modulator 18 of FIG. 1. Thus, shutter 194 is actuated to its on or open position with ports 196 aligned with stator ports 186 to open air intake and exhaust communication. Rotation of rotor 210 then results in intermittent presentation of rotor ports 214 in-line with stator ports 186 to allow air under pressure from plenum chamber 164 to surge into the air cushion 34. Upon further rotation, about 30 to 40 degrees for the number of ports illustrated, the rotor ports 214 will align with the next adjacent pair of shutter ports 196 and stator ports 186 to effect exhaust venting wherein air at increased pressure from cushion 34 is allowed to vent out through exhaust openings 182 of top plate 176. Thus, there is caused what is effectively a positive and negative excursion of the air pressure within air cushion 34.

After generation of the modulated pressure sequence, shutter 194 may be actuated to shift and close stator ports 186 relative to shutter ports 196, while simultaneously aligning the stator auxiliary ports 188 and the shutter auxiliary ports 198 (FIG. 15) thereby to allow air under pressure from plenum chamber 164 to flow into the air cushion 234 at a relatively constant rate thereby to achieve flight and aid in movement of the carrier 162.

FIG. 17 illustrates an air cushion vibrator 220 utilizing a pair of rotary air modulators 222 and 224 at spaced positions on a carrier 226. Once again, carrier 226 will define an internal volume or plenum chamber 22 throughout in collective communication with rotary air modulators 222 and 224. A fan compressor or air source 20 of sufficient size and input rating may be centrally mounted on carrier 226 or, alternatively, a plurality of air sources 20 may be utilized in pre-selected spacing on carrier 226.

Synchronized control of rotary air modulators 222 and 224, as will be further described below, is effected utilizing a hydraulic power supply 228 connected to supply drive power to respective modulator servo valves 230 and 232, servo valves 230 and 232 being synchronously controlled by means of connections 234 and 236 from an electric control system 238. Feedback information from respective hydraulic drive systems of rotary air modulators 222 and 224 is supplied via connectors 240 and 242 as fed back to electric control system 238. The specific control circuitry is the particular subject matter of U.S. patent application Ser. No. 773,926, now U.S. Pat. No. 4,095,425, entitled "Control System for Rotary Air Modulator," filed concurrently herewith.

It is important to observe in construction of the vehicle carrier and modulators, that no point in the carrier plenum chamber should be a horizontal distance greater than a quarter wavelength, i.e., of the highest frequency to be generated, from each respective air modulator circumfery. Spacing of rotary air modulators is best made at least one-half of such wavelength. Observance of these criteria will then enable optimum seismic energy output and optimum synchronization in the case of multiple rotary air modulators.

FIG. 18 illustrates one form of electric control system and associated hydraulics as may be utilized to effect synchronous control of one or more rotary air vibrators. The system is more fully described in the aforementioned co-pending patent application. Thus, a common reference frequency circuit 250 is utilized to control drive frequency by means of respective drive-control circuits 252 and 254 as would be associated with a respective rotary air modulator, e.g., rotary air modulators 222 and 224 of FIG. 17. The control system of FIG.

18 provides precise speed control capable of tracking continuously over a wide-speed range. The system provides to each modulator a set of common reference frequencies which are then applied to each of two separate speed control systems to hold them in speed synchronization and within a small error of the same angle of rotation at any given time. Some of the primary concepts of a control system of this type are disclosed in U.S. Pat. No. 3,361,949, Brown et al., such teachings being applied to a drive system for magnetic recording mechanism.

The control system provides for each modulator a compound feedback system for controlling the individual drive speeds. The system provides for comparison of both a velocity reference and a phase angle reference to maintain respective hydraulic drives of one or more rotary air modulators at exact velocity and position of angular rotation. At slower speeds friction and ripple voltages in both the velocity and angular position feedback circuits tend to produce slightly more erratic movement of the hydraulic motor, and this variation is further smoothed utilizing negative feedback indication from the differential pressure which drives the respective hydraulic motors. The use of the control system as disclosed allows the speed control range to vary continuously and smoothly over a relatively wide speed range of at least 20:1 with normal operating output frequencies of 3 Hz to 60 Hz, e.g., this corresponds to rotor shaft speeds from 22.5 rpm to 450 rpm in one existing system.

A frequency reference 256 provides output of the basic timing signal. The frequency reference 256 may be such as a well-known form of variable oscillator which can be adjusted within limits consonant with the desired modulated air output, as will be further described below. Thus, frequency reference 256 provides output to a frequency divider 258 which, in turn, provides output on a lead 260 of a phase reference frequency. For the present discussion, frequency divider 258 divides down at a 64:1 ratio as will be further described. The phase reference frequency on lead 260 is then applied in parallel to each of the separate modulator phase detectors 262 and 264. Output from the basic frequency reference 256 is also applied to a frequency to voltage converter 266 which provides an analog voltage output via lead 268 for input to each of the separate modulator summing networks 270 and 272.

Basic rotational speed is controlled by the velocity reference voltage on lead 268. That is, for hydraulic motor no. 1, velocity reference input to summing network 270 is altered by the various feedback routes to provide output through a D-C amplifier 274 to provide control of a servo valve 276, of well-known type, which then controls hydraulic motor 278 to drive at the requisite rotational speed. Actual speed of hydraulic motor 278 is read out by linkage 280 to a shaft encoder 282 to provide additional feedback outputs 284 and 286. The shaft encoder 282 may be such as the Model 5 V87BL which is available from Baldwin Electronics, Inc. of Little Rock, Arkansas. The output 284 from shaft encoder 282 is then applied to a frequency to voltage converter 288 which applies an output via lead 290 that is an angular velocity error voltage for input to the summing network 270. Output 286 from shaft encoder 282 provides yet another output to a phase detector 262 which also receives the divided phase reference frequency on lead 260. Phase detector 262 then provides a phase error voltage output via lead 292 for input to summing network 270.

Additionally, and for the purpose of combating ripple voltage variations and the like, a pressure transducer 294 is connected to sense pressure variations in the drive line of hydraulic motor 278 thereby to generate still another correction voltage on a lead 296 for input to summing network 270. Thus, the output from summing networ 270 is the vector sum of the pressure transducer feedback voltage on lead 296, the angular velocity feedback voltage on lead 290 and the phase error voltage on lead 292. The summing network output is then applied through amplifier 274 and servo valve 276 to correctly drive hydraulic motor 278 at its designated speed. The pressure transducers 294 and 294a may be a commercially available form of differential pressure detectors as are available from Validyne Engineering Corporation of North Ridge, Calif.

The control circuit 254 controlling hydraulic motor No. 2 functions in identical manner from the same frequency reference 256 such that it is maintained in exact speed of rotation and angle of rotation throughout whatever the designated sweep of frequency. Thus, hydraulic motor 278a is driven under control of servo valve 276a and input amplifier 274a in accordance with the characteristic output from summing network 272. A similar form of shaft encoder 282a provides output indication of actual hydraulic motor rotation to phase detector 264 which provides phase error voltage on a lead 292a for feedback to the summing network 272. Also, velocity output of shaft encoder 282a is applied through a frequency to voltage converter 288a for output on a lead 290a to summing network 272. Yet another pressure transducer 294a senses the hydraulic drive to hydraulic motor 278a to provide a voltage reference output via line 296a to summing network 272 such that output to amplifier 274a is always a correct speed value as effected by feedback providing velocity reference, angular velocity error, phase error and drive pressure reference.

Generally speaking, it is desirable to controllably generate seismic energy frequencies in a low frequency range, e.g., from 3 Hz. to 60 Hz. In this event then, the variable frequency oscillator of frequency reference 256 should be controllable within that output frequency range which will generate such rotary air modulator output frequencies. By way of example, it will be assumed that the instantaneous output frequency of the rotary air modulators is 10 Hz. Thus, at this frequency of energy output, the phase reference frequency on lead 260 as supplied to phase detector 262 must also be 10 Hz., and the velocity reference frequency as output from frequency reference 256 will be 640 Hz. (Reference being to No. 1 Motor 278).

In the particular case, we have discussed one form of rotary air modulator that is designed with eight slots which then produce an output frequency eight times the actual shaft speed so that the shaft speed is 10 divided by 8 which equals 1.25 revolutions per second for the modulator, the hydraulic motor, and the shaft encoder 282. Two encoder outputs from shaft encoder 282 are used. A first output generates eight pulses per revolution which, at 1.25 revolutions per second, is equal to 10 pulses per second as output to the phase detector via lead 286. A second encoder output via lead 284 is generated at 512 pulses per revolution which, at 1.25 revolutions per second, is equal to 640 pulses per second. The encoder track of 8 pulses per revolution corresponds to the output openings of the rotary air modulator so that the phase detector output on lead 292 is a measure of the angular error between the reference angle established by the phase reference and the actual angle attained by the modulator rotor. The encoder track of 512 pulses per revolution, as output on lead 284 to frequency to voltage converter 288, corresponds to ⅛ of 512 or 64 times the output openings of the rotary air modulator, and approximates in output frequency to the velocity reference frequency as output from variable frequency reference 256. Velocity reference is supplied by both the frequency reference, as applied to frequency to voltage converter 266, and the frequency feedback, as output from frequency to voltage converter 2-8. These values are vector summed in summing networks 270 for amplification and control of servo valve 276 and hydraulic motor 278. Thus, the velocity reference feedback provides a velocity comparison to drive the hydraulic motor 278 to approximately the greatest speed with only a small velocity error. The phase (or angular position) feedback system via lead 292 to summing network 270 then brings the velocity to the exact velocity with only a small error in angular position. At slower speeds friction and ripple voltages in both velocity and angular position signals tend to produce more erratic movement of the motor, and this effect is smoothed by use of negative feedback from the differential pressure driving the motor as is sensed by pressure transducer 294 to provide yet another input to summing network 270. Motor 278a is controlled identically.

FIG. 19 illustrates an extended air cushion vehicle scheme in which a vehicle 300 utilizes a larger plurality of equi-spaced rotary air modulators functioning from a common plenum enclosure which is air pressure charged by one or more air sources 20. A ground-contacting skirt 42 is again used in manner similar to that for prior embodiments. The control system of FIG. 18 will function as described previously to control synchronously such a multi-modulator vehicle 300. It is only necessary to provide the requisite feedback system for each rotary air modulator while a single frequency reference 256 controls and coacts therewith. Thus, a variable frequency oscillator serves as frequency reference to provide timing frequency voltage of desired frequency, duration and sweep rate for synchronous control of all rotary air modulators. Each modulator hydraulic motor will then function with a respective velocity and phase feedback system to adhere to proper rotor speeds.

It should be understood that while the present disclosure is made with respect to particular design specifications, the design as to plenum volume, average pressure and the size and disposition of ports in each of the stator, shutter and rotor may be varied considerably in order to achieve a particular modulation effect. It has been found that the width of ports may be altered variously in order to affect the wave form and modulation shape, i.e., any selected shape varying from square wave to arcuate wave shape may be achieved by varying the port open area, particularly the width thereof. Greater energy of output is achieved by synchronized modulation of air pressure utilizing two or more associated rotary air modulators functioning within the common plenum chamber in order to achieve still greater input of usable compressional wave energy to a receiving medium. Employ of the multiple rotary air modulator structure necessarily requires precise synchronization of modulation as between the air modulating units, i.e., synchronization as to phase as seen by the receiving medium.

The foregoing discloses a novel seismic signal source which exhibits particular advantages as to wave penetration and fidelity over certain frequency ranges. The rotary air modulator is capable of providing air cushion coupling of compressional wave energy of considerable power while still exhibiting the desirable characteristics as to control of frequency, frequency variation and output duration. A seismic source constructed in accordance with the present teachings also embodies the desirable attribute of being able to maintain its low flying consistency during operation as air pressure flying force is applied not only during the periods when air is increased in the air cushion but during the exhaust periods or what may be termed the negative excursion of the air cushion pressure.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for modulating air at selected pressure, comprising:
   a source of air pressure;
   a plenum enclosure connected to said source to receive and maintain air at elevated pressure;
   stator means disposed in communication with said plenum by means of a plurality of circularly disposed ports;
   shutter means having a plurality of circularly disposed ports, said shutter means being placed adjacent to said stator means and rotatable to open and close said stator means ports;
   rotor means having a plurality of circularly disposed ports, said rotor means being placed adjacent to said stator means and shutter means in rotational support;
   means actuatable to rotate said shutter means to open and close said stator means ports; and
   motor means energizable to rotate said rotor means at selected rotational speed.

2. Apparatus as set forth in claim 1 wherein said stator means further comprises:
   a plurality of intake ducts in communication with said plenum enclosure and each alternate one of said circularly disposed ports; and
   second ducts in alternating position to said first ducts which are sealed from said plenum enclosure and in communication with the exterior atmosphere and the remaining circularly disposed ports of said stator means.

3. Apparatus as set forth in claim 1 which is further characterized to include:
   a plurality of first auxiliary ports circularly disposed about said stator means in radial alignment with said stator means ports; and
   a plurality of second auxiliary ports circularly disposed about said shutter means in juxtaposition to radial alignment with said shutter means ports.

4. Apparatus as set forth in claim 1 wherein:
   said stator means is a cylinder, said shutter means is a concentric adjacent cylinder, and said rotor means is a concentric adjacent cylinder.

5. Apparatus as set forth in claim 3 wherein:

said stator means is a cylinder, said shutter means is a concentric adjacent cylinder, and said rotor means is a concentric adjacent cylinder.

6. Apparatus as set forth in claim 1 wherein:
said stator means is a disc, said shutter means is a disc and said rotor means is a disc.

7. Apparatus for generating seismic wave energy within an earth medium by coupling of modulated air pressure thereto, comprising:
carrier means including a source of air pressure and a relatively large volume plenum enclosure which is connected to said source of air pressure to maintain air at elevated pressure within said enclosure;
stator means disposed to communicate with said plenum enclosure by means of a plurality of circularly disposed ports;
shutter means having a plurality of circularly disposed ports, said shutter means being placed adjacent to said stator means and rotatable selectively to open and close said stator means ports;
rotor means having a plurality of circularly disposed ports, said rotor means being placed adjacent to said stator means and shutter means in rotational support;
means actuatable to shift said shutter means in rotation to alternately open and close said stator means ports; and
motor means energizable to rotate said rotor means at selected rotational speed thereby to vary the frequency of air modulation within an air cushion adjacent the earth medium when said shutter means is shifted to open said stator means ports.

8. Apparatus as set forth in claim 7 which is further characterized to include:
a plurality of first intake ducts in communication with said plenum enclosure and each alternate one of said stator means ports; and
second ducts in alternating position to said first intake ducts which are sealed from said plenum enclosure and in communication with the exterior atmosphere and the remaining ports of said stator means.

9. Apparatus as set forth in claim 7 which is further characterized to include:
a plurality of first auxiliary ports circularly disposed about said stator means in radial alignment with said stator means ports; and
a plurality of second auxiliary ports circularly disposed about said shutter means in juxtaposition to radial alignment with said shutter means ports, such that said air cushion receives flight aiding air pressure when said shutter means closes the stator means ports.

10. Apparatus as set forth in claim 9 which is further characterized in that:
said stator means includes sixteen of said ports, said shutter means includes sixteen of said ports, and said rotor means includes eight of said ports.

11. Apparatus as set forth in claim 7 which is further characterized to include:
stabilizer means in contact with said earth medium and connected to said carrier to stabilize the position of said carrier relative to said earth medium during generation of said air cushion adjacent to the earth medium.

12. Apparatus as set forth in claim 7 wherein each of said stator means, shutter means and rotor means are cylindrical and disposed in concentric relationship.

13. Apparatus as set forth in claim 7 wherein each of said stator means, shutter means and rotor means are discs.

14. In a seismic energy generator of the type which couples energy into an earth medium by means of an air cushion formed adjacent the surface of the earth medium, which generator includes a plenum chamber in communication with a source of air at increased pressure and an air modulator for controlling flow of air between said plenum chamber and the air cushion, an improved air modulator comprising:
first means having a plurality of first ports for enabling air passage between the plenum chamber and the air cushion and having a plurality of second ports for enabling air passage between the air cushion and external atmosphere;
second means having a plurality of third ports, which second means may be shifted in position to close and open selectively said first and second ports; and
third means providing a plurality of fourth ports which third means may be rotated at selected speed to vary the air pressure within said air cushion at a preselected frequency when said second means is shifted to open said first and second ports.

15. An air modulator as set forth in claim 14 wherein said first, second and third means are of cylindrical formation disposed in adjacent concentric relationship.

16. An air modulator as set forth in claim 14 wherein said first, second and third means are of circular disc formation disposed in adjacent concentric relationship.

* * * * *